United States Patent [19]

Haas

[11] B 3,925,526
[45] Dec. 9, 1975

[54] METHOD OF MAKING AN INTEGRAL SKIN FOAMED PRODUCT WHEREIN PORTIONS OF THE SKIN ARE OF GREATER DENSITIES

[75] Inventor: James Lynn Haas, Aliquippa, Pa.
[73] Assignee: Owens-Corning Fiberglas Corporation, Toledo, Ohio
[22] Filed: Feb. 4, 1972
[21] Appl. No.: 223,621
[44] Published under the Trial Voluntary Protest Program on January 28, 1975 as document no. B 223,621.

[52] U.S. Cl. ............... 264/45.5; 428/305; 428/315; 428/425; 428/218; 264/DIG. 83; 180/69 R; 249/79; 264/48; 264/53; 264/345; 264/348; 264/DIG. 5; 264/DIG. 14; 296/31 P; 425/817
[51] Int. Cl.² ........................................ B29D 27/04
[58] Field of Search .... 264/48, 54, 45, 52, DIG. 14, 264/DIG. 83, 237, 348, 321, 345, DIG. 5; 161/160, 161, 190; 296/31 P; 425/817; 180/69 R; 249/79

[56] References Cited
UNITED STATES PATENTS

| | | | |
|---|---|---|---|
| 2,272,930 | 2/1942 | Black | 264/DIG. 14 |
| 3,007,203 | 11/1961 | Ammons | 264/DIG. 14 |
| 3,099,516 | 7/1963 | Henrickson | 264/48 |
| 3,129,270 | 4/1964 | Hood | 264/54 |
| 3,211,605 | 10/1965 | Spaak et al. | 264/DIG. 83 |
| 3,269,882 | 8/1966 | Willy | 264/237 X |
| 3,324,209 | 6/1967 | Holt et al. | 264/237 X |
| 3,534,128 | 10/1970 | Makowski | 264/237 X |
| 3,558,751 | 1/1971 | Santelli | 264/DIG. 14 |
| 3,632,266 | 1/1972 | Winstead | 264/48 UX |

OTHER PUBLICATIONS du Pont Bulletin: "Rigid Urethane Foams Methods of Application," Wilmington, Del., E. I. du Pont de Nemours & Co., (Inc.), Elastomer Chemicals Dept., June 1957, A-4713-2M-4-62., 8 pp.
Mobay Chemical Co. Bulletin: "The Rolling Showcase For Engineering Plastics," Pittsburgh, Pa., Mobay Chemical Co., Approx. 1968, pp. 1-8.
Weir, Clifford L., "The Action Is Swinging to Structural Foams," In Plastics Technology, April 1972, pp. 37-41.

*Primary Examiner*—Philip E. Anderson
*Attorney, Agent, or Firm*—Carl G. Staelin; John W. Overman; Allen D. Gutchess, Jr.

[57] ABSTRACT

A plastic foam product and a method and apparatus for molding same are provided. The product has a foamed plastic core and a plastic skin having different densities in predetermined portions. The product is made from a foamable plastic compound capable of foaming in situ in a mold cavity. Gas in the plastic compound vaporizes to cause foaming, with the foaming plastic moving into contact with the mold wall which is relatively cold. Means are provided in conjunction with the mold wall to provide greater cooling of the foaming plastic in predetermined portions of the mold wall than in other portions. Some of the gas then condenses and re-dissolves in the foam, depending upon the extent of the cooling of the foam, and the vapor pressure in the mold, with more gar redissolving where cooling rates are higher. A denser skin thereby results on the product where the larger amounts of gas are redissolved. The dense portions of the skin are particularly effective for providing increased structural reinforcement and stiffness for the product with relatively little added weight. For colored foam, the denser portions can provide both a structural benefit and a decorative pattern for the product.

1 Claim, 7 Drawing Figures

METHOD OF MAKING AN INTEGRAL SKIN FOAMED PRODUCT WHEREIN PORTIONS OF THE SKIN ARE OF GREATER DENSITIES

This invention relates to a method for producing a plastic foamed product having a foamed core and an integral skin.

Plastic foam products can be molded by foaming a suitable plastic compound in situ in a mold cavity. A predetermined amount of the plastic compound is placed in the mold cavity, with gas in the compound vaporizing to cause the compound to foam and expand outwardly, generating heat which causes further foaming. The foam moves toward and into contact with the wall of the mold cavity where it cools, causing the gases vaporized from the foam to condense and re-dissolve in portions of the foam adjacent the mold walls. These portions of the foam collapse and form a skin on the product which retains a foamed plastic core.

In accordance with the invention, it has been discovered that the cooling effect of the mold wall on the foam can be controlled to vary the degree of condensing of the gas and, consequently, the amount re-dissolved in the plastic material. Accordingly, the degree of collapse of the foam adjacent the mold wall is ultimately controlled to cause portions of different densities to be produced in the skin of the product. The more dense areas of the skin so produced can achieve desired increased structural properties in the foam product without significantly adding weight to the product or increasing the size thereof. In a panel, for example, ridges or lineal portions of higher density can be formed in the skin to provide increased stiffness, strength, and resistance to impact, and reduced warping tendencies. Particularly with colored plastic materials, the cooling of the mold wall can be controlled in patterns so that the resulting portions of increased density in the product's skin can produce a permanent decorative pattern for the product.

In a preferred form of the invention, the control of the cooling effect of the mold wall is accomplished through providing specific areas of greater heat absorption, preferably in a predetermined pattern. This can be accomplished through cooling passages built into or placed adjacent, in heat exchange relationship with, the mold wall. It can also be accomplished in a mold wall of metal or other heat conducting material by increasing the thickness of the mold wall in certain areas to form heat sinks and provide greater heat-absorbing capacity in predetermined portions of the wall. In both instances, the resulting portions of the mold wall with the greater cooling capacity produce corresponding desired portions of increased density in the product skin. It is also possible to provide hot fluid through appropriate lines or passages in or adjacent the mold wall. In that instance, a thinner skin is produced at the portions corresponding to the heated portions of the wall, with those portions of the mold wall which are unheated then producing a skin of greater density.

It is, therefore, a principal object of the invention to produce a plastic foam product having a foamed plastic core and a skin thereon, which skin is of different densities in predetermined portions thereof.

Another object of the invention is to provide a method of making a foamed plastic product having an external skin of higher density in portions thereof.

A further object of the invention is to produce a plastic foam product having a skin with portions thereof of increased density in a predetermined pattern, particularly to provide a decorative effect.

Still another object of the invention is to provide a process wherein apparatus utilized for molding the plastic foam product, includes a mold having a wall of different heat-absorbing capacities in predetermined portions thereof.

Other objects and advantages of the invention will be apparent from the following detailed description of preferred embodiments thereof, reference being made to the accompanying drawings, in which.

A foamable plastic compound which can be utilized in the invention has a gas dissolved therein which vaporizes at relatively low temperatures and then can condense and re-dissolve in the plastic material with the aid of the vapor pressure in the mold; this pressure can be as high as 500 psi in some instances. The gas should vaporize or boil at a temperature between about 20° and 400°F. and preferably in a range of 60°–80°F. Various gases can be used to foam the plastic material. Freon F-11B (monofluorotrichloromethane) with a boiling point of about 70° has been found to be satisfactory. Other foaming agents can be selected from Freon 113, methylene chloride, methyl ethyl ketone, acetone, ethyl acetate, butyl acetate, and diacetone alcohol, by way of example. However, factors such as higher boiling points, high costs, excessive flammability, poor insulating characteristics, corrosive characteristics, and poor polymer solubility make some of these other potential foaming agents less desirable, at least from a practical standpoint.

The plastic material employed preferably is a urethane or an isocyanurate, However, the use of other plastic materials such as epoxies also is possible. By way of example, a suitable plastic compound usable in the invention is a urethane comprising:

100 parts polyol with a hydroxyl number of 420
 100 parts polymeric isocyanate
 15 parts Freon F-11B
 0.5 part amine catalyst
 0.5 part cell controller.

All of the above except the polymeric isocyanate are mixed together and this mixture then mixed with the polymeric isocyanate. A liquid results which is then placed in a mold and closed. The resulting heat of reaction causes the Freon to vaporize and cause foaming. As the foaming material expands and fills the mold, it reaches the mold wall, which is relatively cool, with the Freon in that portion of the foam condensing and re-dissolving in the plastic material. This causes a dense skin to form at the surface. The mold wall has predetermined portions of greater heat-absorbing capacity, resulting in the corresponding portions of the product skin being more dense.

By way of further example, an isocyanurate compound which can be utilized in the invention comprises:
100 parts polymeric isocyanate
7 parts Freon F-11B
10 parts isocyanurate-producing catalyst
0.5 part cell controller
20.0 parts polyol.

All but the polymeric isocyanate are mixed together and these are then mixed with the isocyanate and a predetermined amount placed in a mold where the foaming process results, in the same general manner as with the urethane.

Figure 1:
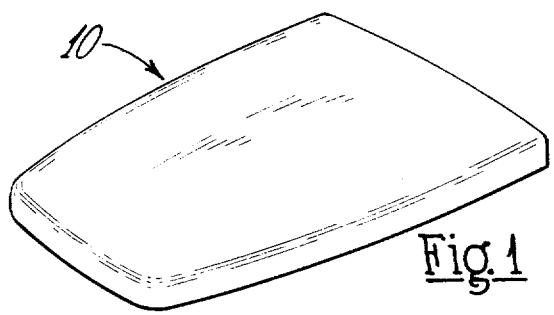
FIG. 1 is a view in perspective of a plastic foam product according to the invention.

Referring to the drawings, and more particularly to FIG. 1, an automobile hood indicated at 10 is an example of a product which can be molded in accordance with the invention. The hood 10 has a relatively large, flat expanse and tends to be more flexible than desired, when made of plastic or foamed plastic material. As shown in longitudinal cross section in FIG. 2, the hood 10 is made of urethane plastic compound which is foamed in situ in a mold. A core 12 of the hood is of urethane foam while a skin 14 is of dense urethane material. By way of example, the core might have a density of 4 pounds per cubic foot while the skin has an apparent density of 40–70 pounds per cubic foot. The skin 14 is formed when the plastic material foams and expands outwardly, coming into contact with a surface 16 defining a mold cavity generally indicated at 18. The relatively cold surface 16 and the vapor pressure built up in the mold cause the foaming gas, which has vaporized from the plastic material to cause the foaming, to condense and re-dissolve into the plastic material at the surface. This causes the foam to collapse into a dense material in contrast to the foamed core 12, and thereby produce the dense skin 14 which forms a rather distinct line with the foamed core when the product is viewed in section, as in FIG. 2.

Figure 2:
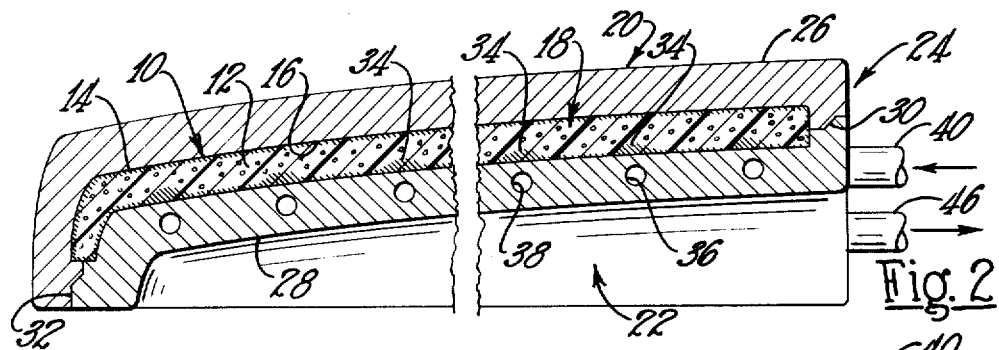
FIG. 2 is an enlarged, schematic, fragmentary view in longitudinal cross section taken through a mold in which the product of FIG. 1 can be made, and further showing the product after being molded and ready for removal from the mold.
Figure 3:
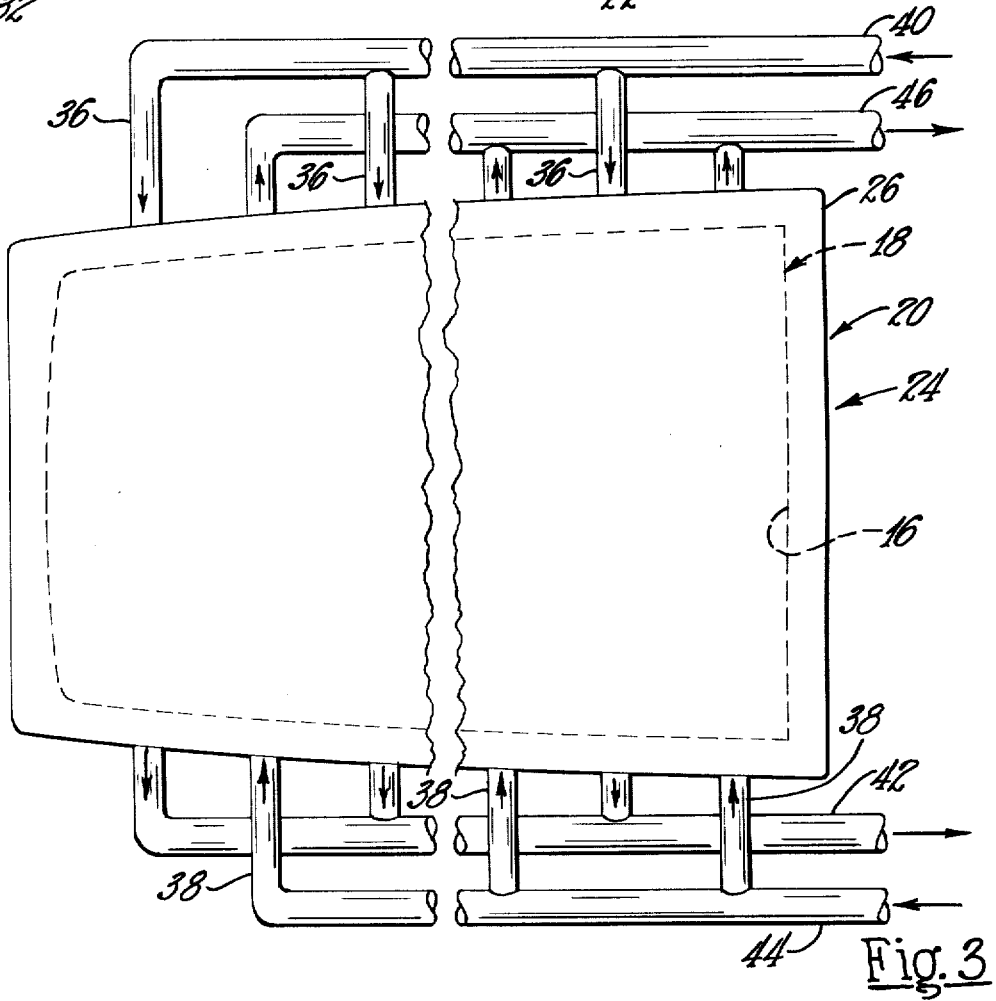
FIG. 3 is a schematic, fragmentary plan view of the mold of FIG. 2.

Referring to FIGS. 2 and 3, the mold cavity 18, in this instance, is formed by two halves or parts 20 and 22 of a mold 24. The upper mold half 20 has a wall 26 suitably contoured to form the upper, outer surface of the hood 10, and the lower mold half 22 has a mold wall 28 contoured to form the lower, inside surface of the hood 10. The two mold halves meet at suitable parting lines indicated at 30 and 32. The upper mold half can be provided with a suitable opening to receive the foamable plastic compound or it can simply be placed in the cavity when the mold halves are separated. Suitable clamps, not shown, are also used to prevent separation of the mold halves when subjected to the internal pressure of the foaming plastic.

Figure 4:
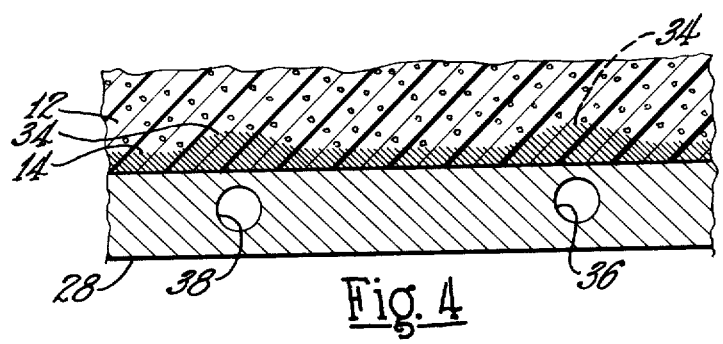
FIG. 4 is an enlarged, schematic fragmentary view in cross section of a portion of the mold shown in FIG. 2.

In accordance with the invention, it has been discovered that by changing the cooling capacity or ability of predetermined portions of a mold wall, such as the wall 26 or 28, the formation of the skin 14 by the foaming plastic material can be controlled. The greater cooling causes more condensing and re-dissolving of the foaming gas and thereby causes more pronounced and dense skin to occur where the cooling rate is higher. In the particular example shown, a plurality of dense skin portions or ridges 34 (FIGS. 2 and 4) are formed in the lower surface or skin of the hood 10 by increasing the cooling rate of the mold wall 12 in predetermined portions. The dense skin portions 34 are controlled to extend transversely across the hood 10 and substantially increase the strength and stiffness thereof. These dense portions, which constitute internal ribs, in effect, also increase the impact resistance of the adjacent surface and yet do not form any discernible physical change in the contour of the surface of the product. All of this is achieved with little increase in the weight of the product and correspondingly little increase in the amount of plastic material required.

One manner in which the cooling rate of the lower mold wall 28, in this instance, can be increased is by providing cooling passages 36 and 38 therein. Rather than being in the wall 28 itself, as shown, the cooling passages 36 and 38 can be placed adjacent the outer surface of the wall, in heat exchange relationship therewith. However, the closer the cooling passages 36 and 38 are to the inner surface 16 of the mold cavity 18, the more concentrated will be the cooling effect and the more concentrated will be the resulting dense skin portions 34 of the product.

In this instance, suitable coolant, such as cold water, is supplied to the passages 36 from a supply manifold 40 with the coolant removed through a return manifold 42 which can supply the coolant to a suitable heat exchanger for cooling prior to being returned to the passages 36. Similarly, the passages 38 are supplied coolant from a supply manifold 44 located on the opposite of the mold 24, with the coolant removed through a return manifold 46. By supplying the coolant from opposite sides to the adjacent cooling passages 36 and 38, the cooling effect of the coolant is offset or staggered since the coolant has a slightly greater cooling effect on the side of the mold from which it enters the passages 36 or 38 than on the opposite side thereof. Consequently, the dense portions 34 tend to be slightly more pronounced on the side from which the coolant enters. With the staggered arrangement, however, a substantially uniform product is achieved despite small variations in the dense portions or ridges 34.

Figure 5:
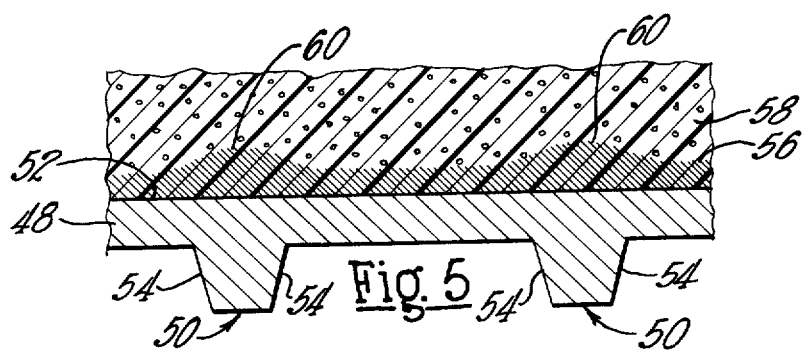
FIG. 5 is a view similar to FIG. 4, but of a modified mold.

Rather than employing the cooling lines or passages 36 and 38, a different manner of achieving controlled cooling rates is shown in FIG. 5. In this instance, a modified mold wall 48 has enlarged portions 50 extending from predetermined portions of the wall to constitute heat sinks. These are relatively large metal masses which enable the heat to be conducted from an inner surface 52 of the mold cavity more effectively than at the conventional portions of the mold wall 48. As shown, the heat sinks 50 are not only massive as compared to the mold wall, but also have tapered side walls 54 which increase the rate of heat dissipation from the heat sinks 50 and thereby further enhance their cooling effect on the inner surface 52 of the mold wall. With the heat sinks 50, a skin 56 of the product having a foamed core 58 has dense portions or ridges 60 formed therein. The cooling effect of the heat sinks usually is not quite as pronounced as the cooling effect of the coolant passages 36 and 38. Consequently, the dense portions 60 formed in the skin 56 are not quite as pronounced relative to the skin 56 as are the dense portions 34 of the skin 14.

Figure 6:
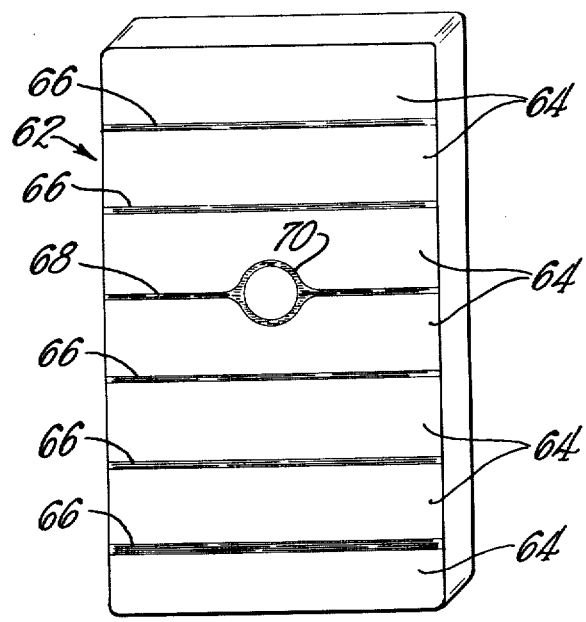
FIG. 6 is a view in perspective of another plastic foam product according to the invention.

Besides having beneficial structural effects, the dense portions formed adjacent the surface of the product can have a decorative effect. When a colored foamable plastic material is employed for the product, it has been discovered that the dense portions 60 form a darker, or more intense, color at the surface of the product. Thus, a product shown in FIG. 6 is made of colored foamable plastic material and produced in a mold having wall portions with different cooling rates. In this instance, a cold storage door 62 represents the product made in a mold having a surface shaped to form an outer surface 64 of the door, which mold surface is provided with different cooling capabilities in predetermined portions. With the portions having greater cooling capabilities extending lineally and transversely across the mold, dense decorative lines 66 result in the final product 62 even though the contour of the surface 64 is not changed. This is due to the concentrated effect of the color in the foam. A modified decorative dense portion 68 with a circular central portion 70 is achieved by so shaping the cooling effect in the mold wall, whether the effect is achieved through coolant passages or by heat sinks. The decorative pattern achieved with heat sinks may be subject to greater variations than that achieved through cooling passages, but the heat sinks tend to produce less sharp lines or patterns than the cooling passages, particularly when placed close to the inner surface of the mold wall which forms the mold cavity.

Figure 7:
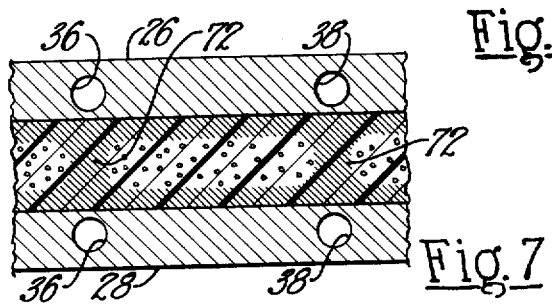
FIG. 7 is an enlarged, schematic, fragmentary view in cross section of a portion of a modified mold, similar to that of FIG. 2.

The cooling passages or the heat sinks can be used with more than just one mold wall, if desired. For example, the cooling passages 36 and 38 can be employed in or with the mold wall 26 (FIG. 7) as well as the wall 28 to provide further improvement in the physical characteristics of the molded product. If the cooling means in the opposite mold walls are aligned and if the cooling effect is sufficient relative to the thickness of the molded product, the thick or dense skin portions can extend completely across the product to form bridges or beams 72 to further enhance the physical properties. Such portions extending completely across the product produce an approximate I-beam shape as viewed in transverse cross section in FIG. 7.

It is also possible to supply relatively cool fluid through the passages 36 or 38 and relatively hot fluid through the other of the passages 36 or 38. This provides a sharper contrast between the thicker and thinner skin portions which can enhance the decorative effect or increase structural characteristics with even less increase in the weight of the product.

In many or even most instances the mold wall is heated to increase the curing rate of the plastic material after foaming. Consequently, the mold wall, and even portions thereof which are cooled, may be well above room temperature. However, they are still relatively cooler than the foaming plastic material which, through the heat generated therein may reach temperatures in the order of 400°F. Even portions of the mold wall which are selectively heated, as by supplying heated fluid through the passages 36 and/or 38, will still be somewhat cooler than the foaming plastic material, in most instances, at least, even though hotter than other mold wall portions which are not selectively heated.

Various modifications of the above described embodiment of the invention will be apparent to those skilled in the art and it is to be understood that such modifications can be made without departing from the scope of the invention, if they are within the spirit and the tenor of the accompanying claims.

I claim:

1. A method of making a product having a foam core and a skin, which skin differs in density at portions thereof, said method comprising preparing an exothermic, foamable, thermosetting resin reaction mixture including a liquid blowing agent which vaporizes at a temperature between about 20° and 400°F., placing an amount of the mixture in a mold cavity, said amount being sufficient to cause the resulting foam to contact the entire walls of the mold, closing the mold, cooling certain areas of the walls of the mold cavity to a temperature sufficiently low as to cause the blowing agent to condense in those areas and redissolve in the mixture, and thereby form the skin for the product at different densities with denser portions of the skin being located at the surface of the product adjacent the cooled areas, and heating areas of the walls of the mold cavity between cooled areas and thereby form thinner skin areas for the product at the surface portions adjacent the heated areas.

* * * * *